US012602744B2

(12) United States Patent
Xu

(10) Patent No.: US 12,602,744 B2
(45) Date of Patent: Apr. 14, 2026

(54) IMAGE PROCESSING METHOD AND APPARATUS, ELECTRONIC DEVICE AND MEDIUM

(71) Applicant: Beijing Bytedance Network Technology Co., Ltd., Beijing (CN)

(72) Inventor: Yitian Xu, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 314 days.

(21) Appl. No.: 18/274,928

(22) PCT Filed: Nov. 25, 2021

(86) PCT No.: PCT/CN2021/133224
§ 371 (c)(1),
(2) Date: Jul. 28, 2023

(87) PCT Pub. No.: WO2022/160906
PCT Pub. Date: Aug. 4, 2022

(65) Prior Publication Data
US 2024/0095882 A1 Mar. 21, 2024

(30) Foreign Application Priority Data
Jan. 29, 2021 (CN) .......................... 202110126858.2

(51) Int. Cl.
*G06T 5/50* (2006.01)
*H04N 23/71* (2023.01)
*H04N 23/76* (2023.01)

(52) U.S. Cl.
CPC .............. *G06T 5/50* (2013.01); *H04N 23/71* (2023.01); *H04N 23/76* (2023.01); *G06T 2207/10144* (2013.01); *G06T 2207/20221* (2013.01)

(58) Field of Classification Search
CPC ............. G06T 5/50; G06T 2207/10144; G06T 2207/20221; G06T 5/90;
(Continued)

(56) References Cited

U.S. PATENT DOCUMENTS

2016/0057333 A1* 2/2016 Liu ........................ H04N 23/84
348/239

FOREIGN PATENT DOCUMENTS

CN 101394487 A 3/2009
CN 104902168 A 9/2015
(Continued)

OTHER PUBLICATIONS

Sang-hoon Lee, "A Multi-Exposure Image Fusion Based on the Adaptive Weights", 2018 IEEE, Pub. 2018 (Year: 2018).*
(Continued)

*Primary Examiner* — Mekonen T Bekele
(74) *Attorney, Agent, or Firm* — Astute IP Law Group

(57) ABSTRACT

Provided are image processing method and apparatus, an electronic device, and a computer-readable storage medium. The image processing method includes: obtaining at least two to-be-synthesized images, in which the at least two to-be-synthesized images are images of an object captured at different exposures; determining an image luminance value of each of the at least two to-be-synthesized images; determining, for each of the at least two to-be-synthesized images, a luminance weight of each pixel of the to-be-synthesized image based on the image luminance value of the to-be-synthesized image and a luminance value of each pixel of the to-be-synthesized image; and obtaining a target image by performing image synthesis processing based on the luminance value of each pixel of the at least two to-be-synthesized images and the luminance weight of each pixel of the at least two to-be-synthesized images. The
(Continued)

method can improve quality of the synthesized image and user experience.

17 Claims, 2 Drawing Sheets

(58) Field of Classification Search
CPC ............. G06T 2207/20208; G06T 7/90; G06T 2207/10152; H04N 23/71; H04N 23/76; H04N 23/741
See application file for complete search history.

(56) References Cited

FOREIGN PATENT DOCUMENTS

| | | | |
|---|---|---|---|
| CN | 106169182 | A | 11/2016 |
| CN | 107203966 | A | 9/2017 |
| CN | 107454330 | A | 12/2017 |
| CN | 109685727 | A | 4/2019 |
| CN | 110719407 | A | 1/2020 |
| CN | 111479072 | A | 7/2020 |
| CN | 111738950 | A | 10/2020 |
| CN | 112150399 | A | 12/2020 |
| JP | 2009-049547 | A | 3/2009 |
| JP | 2013-243780 | A | 12/2013 |
| JP | 2015-073185 | A | 4/2015 |
| JP | 2019-205073 | A | 11/2019 |
| JP | 7594126 | B2 | 12/2024 |
| WO | 2017050115 | A1 | 3/2017 |
| WO | 2019072190 | A1 | 4/2019 |
| WO | 2019105305 | A1 | 6/2019 |
| WO | 2019148978 | A1 | 8/2019 |
| WO | 2019183813 | A1 | 10/2019 |
| WO | 2020029732 | A1 | 2/2020 |
| WO | 2020107662 | A1 | 6/2020 |
| WO | 2020206659 | A1 | 10/2020 |
| WO | 2021007690 | A1 | 1/2021 |

OTHER PUBLICATIONS

International Search Report in PCT/CN21021/133224, mailed Feb. 22, 2022, 6 pages.
Extended European Search Report in EP21922496.1, mailed Oct. 25, 2023, 12 pages.
Lee et al., "A Multi-Exposure Image Fusion Based on the Adaptive Weights Reflecting the Relative Pixel Intensity and Global Gradient," 2018 25th IEEE International Conference on Image Processing ICIP, IEEE, Oct. 7, 2018, pp. 1737-1741.
International Search Report in PCT/CN2021/133224, mailed Feb. 22, 2022, 6 pages.
Decision to Grant for Chinese Patent Application No. 202110126858.2, mailed Jul. 10, 2024, 7 pages.
Office Action for Chinese Patent Application No. 202110126858.2, mailed Apr. 24, 2024, 15 pages.
Office Action for Japanese Patent Application No. 2023-546001, mailed Jul. 9, 2024, 7 pages.
Notice of Allowance for Japanese Patent Application No. 2023-546001, mailed on Oct. 22, 2024, 6 pages.
Written Opinion for International Application No. PCT/CN2021/133224, mailed on Feb. 22, 2022, 6 Pages.

* cited by examiner

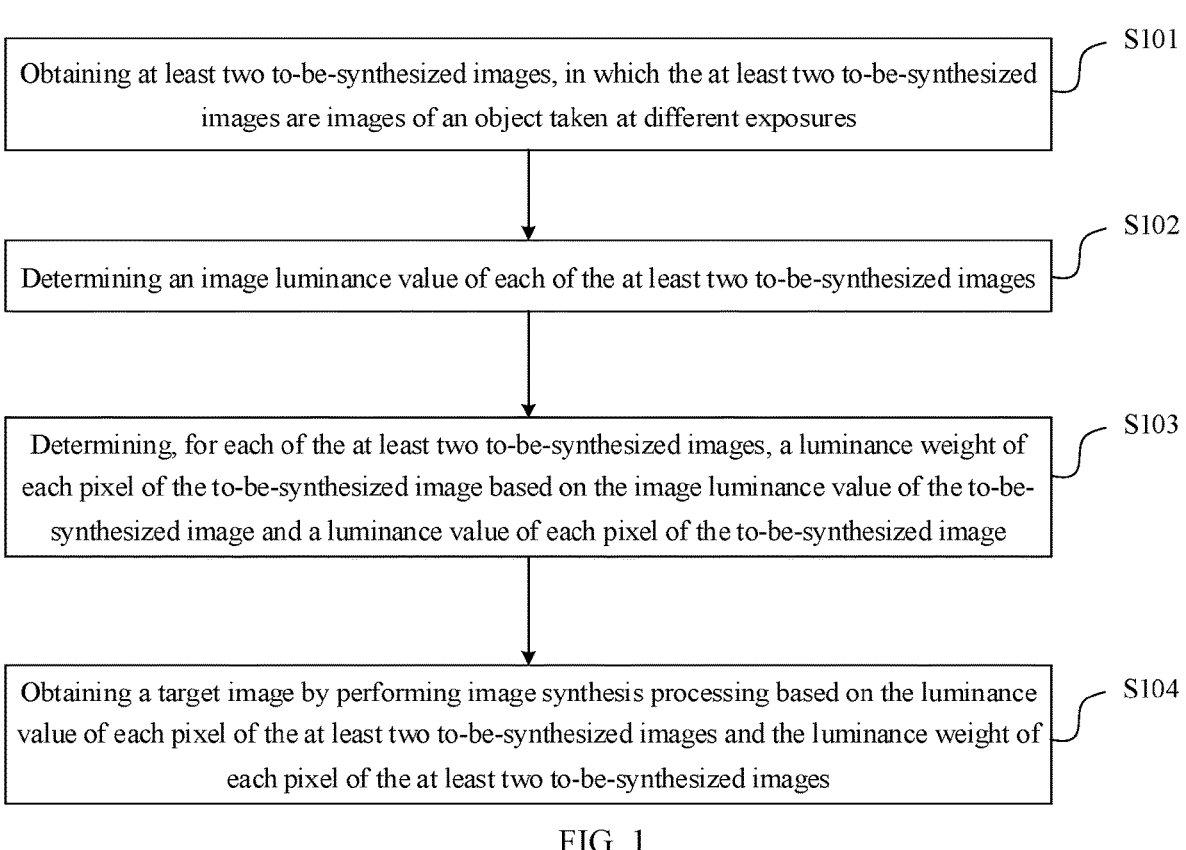

S101 — Obtaining at least two to-be-synthesized images, in which the at least two to-be-synthesized images are images of an object taken at different exposures S102 — Determining an image luminance value of each of the at least two to-be-synthesized images S103 — Determining, for each of the at least two to-be-synthesized images, a luminance weight of each pixel of the to-be-synthesized image based on the image luminance value of the to-be-synthesized image and a luminance value of each pixel of the to-be-synthesized image S104 — Obtaining a target image by performing image synthesis processing based on the luminance value of each pixel of the at least two to-be-synthesized images and the luminance weight of each pixel of the at least two to-be-synthesized images

FIG. 1

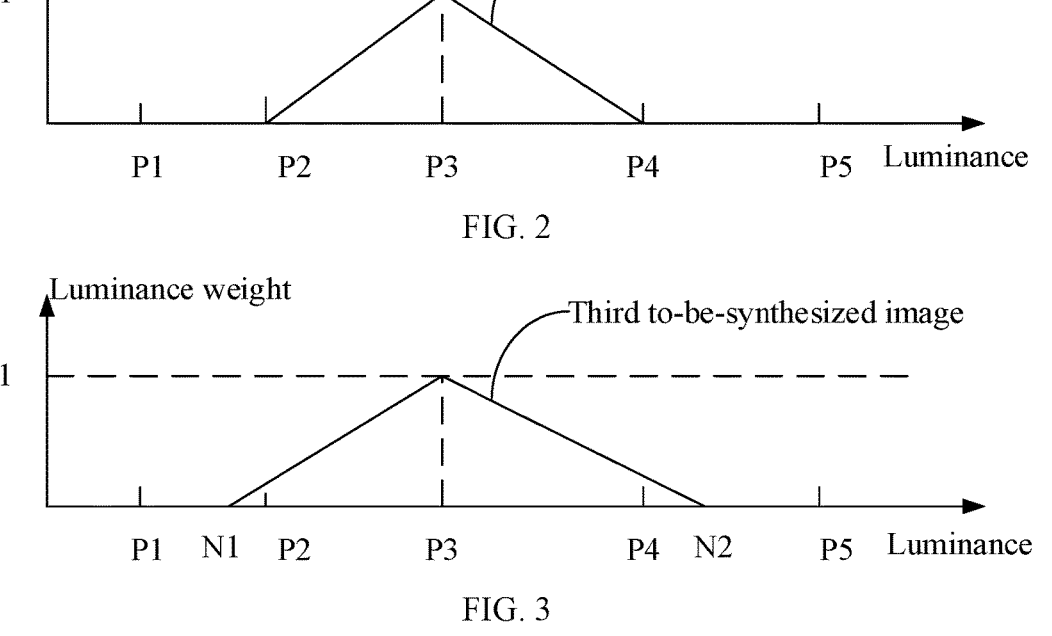

IMAGE PROCESSING METHOD AND APPARATUS, ELECTRONIC DEVICE AND MEDIUM

CROSS-REFERENCE TO RELATED APPLICATION

The present application is a 35 U.S.C. § 371 National Phase of PCT Application No. PCT/CN2021/133224, titled "IMAGE PROCESSING METHOD AND APPARATUS, ELECTRONIC DEVICE AND MEDIUM" filed Nov. 25, 2021, which claims priority to Chinese Patent Application No. 202110126858.2, titled "IMAGE PROCESSING METHOD AND APPARATUS, ELECTRONIC DEVICE AND MEDIUM" filed on Jan. 29, 2021, which are incorporated herein by reference in their entireties.

FIELD

The present disclosure relates to the technical field of image processing, and more particularly, to image processing method and apparatus, an electronic device, and a computer-readable storage medium.

BACKGROUND

With the continuous improvement of people's living standards, various electronic devices are gradually widely applied in all aspects of life, and more and more electronic devices have been equipped with cameras for taking pictures. During user's picture taking, due to environmental factors, an image may inevitably has a partial excessively bright part, a partial excessively dark part, or the like.

In the related art, for images with the partial excessively bright part and the partial excessively dark part due to the environmental factors, a plurality of images of different luminance may be captured at different exposures, and then is synthesized into one image. When synthesized in this way, if the image luminance of the plurality of images is great, the synthesized image becomes relatively bright, or if the plurality of images is dark, the synthesized image becomes relatively dark. That is, the image luminance of the synthesized image is related to image luminance distribution of a plurality of to-be-synthesized images. If the image luminance distribution of the plurality of to-be-synthesized images is uneven, i.e., when the number of to-be-synthesized images of great image luminance differs from the number of to-be-synthesized images of small image luminance greatly, the synthesized image may have greater or smaller image luminance, affecting quality of the synthesized image.

SUMMARY

Embodiments of the present disclosure provide image processing method and apparatus, an electronic device, and a medium, which can solving the technical problem of poor quality of an image obtained by synthesizing a plurality of to-be-synthesized images when image luminance distribution of the plurality of to-be-synthesized images is uneven.

According to one embodiment of the present disclosure, provided is an image processing method. The method includes: obtaining at least two to-be-synthesized images, in which the at least two to-be-synthesized images are images of an object captured at different exposures; determining an image luminance value of each of the at least two to-be-synthesized images; determining, for each of the at least two to-be-synthesized images, a luminance weight of each pixel of the to-be-synthesized image based on the image luminance value of the to-be-synthesized image and a luminance value of each pixel of the to-be-synthesized image; and obtaining a target image by performing image synthesis processing based on the luminance value of each pixel of the at least two to-be-synthesized images and the luminance weight of each pixel of the at least two to-be-synthesized images.

According to one embodiment of the present disclosure, provided is an image processing apparatus. The apparatus includes: an obtaining module configured to obtain at least two to-be-synthesized images, in which the at least two to-be-synthesized images being images of an object captured at different exposures; a first determining module configured to determine an image luminance value of each of the at least two to-be-synthesized images; a second determining module configured to determine, for each of the at least two to-be-synthesized images, a luminance weight of each pixel of the to-be-synthesized image based on the image luminance value of the to-be-synthesized image and a luminance value of each pixel of the to-be-synthesized image; and a synthesis module configured to obtain a target image by performing image synthesis processing based on the luminance value of each pixel of the at least two to-be-synthesized images and the luminance weight of each pixel of the at least two to-be-synthesized images.

According to one embodiment of the present disclosure, provided is an electronic device. The electronic device includes one or more processors, a memory, and one or more applications. The one or more applications are stored in the memory and configured to be executed by the one or more processors to perform operations corresponding to the image processing method as described in the one embodiment of the present disclosure.

According to one embodiment of the present disclosure, a computer-readable medium is provided. The computer-readable medium has a computer program stored thereon. The computer program, when executed by a processor, performs the image processing method as described in the one embodiment of the present disclosure.

Technical solutions of the present disclosure can provide the following advantageous effects.

The image processing method and apparatus, the electronic device, and the medium according to the embodiments of the present disclosure, when Compared with the related art, for each of the at least two to-be-synthesized images, the luminance weight of each pixel of the to-be-synthesized image is determined based on the image luminance value of the to-be-synthesized image and the luminance value of each pixel of the to-be-synthesized image, and the target image is obtained by performing image synthesis processing based on the luminance value of each pixel of the at least two to-be-synthesized images and the luminance weight of each pixel of the at least two to-be-synthesized images. In this way, the luminance weight of each pixel of each of the to-be-synthesized images is related to the image luminance value of the to-be-synthesized image and the luminance value of each pixel of the to-be-synthesized image. That is, the luminance weight of each pixel of each of the to-be-synthesized images takes the image luminance value of the to-be-synthesized image into account, which can reduce influence of uneven image luminance distribution of the at least two to-be-synthesized images and improve quality of the synthesized image, thereby enhancing user experience.

BRIEF DESCRIPTION OF THE DRAWINGS

The above and other features, advantages, and aspects of various embodiments of the present disclosure will become more apparent when taken in conjunction with the accompanying drawings and with reference to the detailed description below. Throughout the drawings, identical or similar reference numerals denote identical or similar elements. It should be understood that the drawings are schematic and that the components and elements are not necessarily drawn to scale.

FIG. 1 is a schematic flowchart of an image processing method according to an embodiment of the present disclosure;

FIG. 2 is a schematic diagram of a mapping relationship between luminance and a luminance weight according to an embodiment of the present disclosure;

FIG. 3 is a schematic diagram of another mapping relationship between luminance and a luminance weight according to an embodiment of the present disclosure;

DETAILED DESCRIPTION

Figure 4:
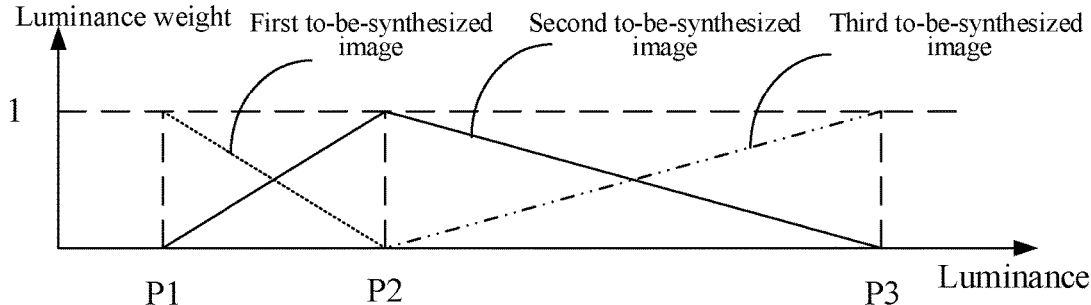
FIG. 4 is a schematic diagram of yet another mapping relationship between luminance and a luminance weight according to an embodiment of the present disclosure.

Embodiments of the present disclosure will be described in more detail below with reference to the accompanying drawings. Although some embodiments of the present disclosure are illustrated in the drawings, it should be understood that the present disclosure can be implemented in various forms and should not be construed as being limited to the embodiments set forth herein. On the contrary, these embodiments are provided to facilitate a more thorough and complete understanding of the present disclosure. It should be understood that the accompanying drawings and embodiments of the present disclosure are only used for illustration, rather than to limit the protection scope of the present disclosure.

It should be understood that steps described in the method embodiments of the present disclosure may be executed in different sequences and/or in parallel. In addition, method implementations may include additional steps and/or omit executions of the illustrated steps. The scope of the present disclosure is not limited in this respect.

The term "include" or "comprise" and its variants as used herein indicate open-ended inclusions, i.e., "includes, but not limited to". The term "based on" refers to "at least partially based on". The term "an embodiment" means "at least one embodiment"; the term "another embodiment" means "at least one additional embodiment"; and the term "some embodiments" means "at least some embodiments". Related definitions of other terms will be given in the following description.

It should be noted that concepts such as "first" and "second" mentioned in the present disclosure are only used to distinguish apparatuses, modules, or units. They are neither used to limit that these apparatuses, modules, or units are definitely different apparatuses, modules, or units, nor used to limit a sequence or interdependence of functions performed by these apparatuses, modules, or units.

It should be noted that modifications such as "a", "an" and "plurality of" mentioned in the present disclosure are schematic instead of restrictive, and should be construed as "one or more" by those skilled in the art, unless otherwise clearly indicated in the context.

Names of messages or information interacted between a plurality of devices in the embodiments of the present disclosure are only used for illustrative purposes, rather than being intended to limit the scope of these messages or information.

The technical solutions of the embodiments of the present disclosure and how the technical solutions of the embodiments of the present disclosure solve the above technical problems will be described in detail below with embodiments. The following several embodiments may be combined with each other, and the same or similar concepts or processes may not be repeated in some embodiments. The embodiments of the present disclosure will be described below with reference to the accompanying drawings.

An embodiment of the present disclosure provides an image processing method, which can be executed by any terminal device. The terminal device may be a mobile phone, a notebook computer, a desktop computer, a tablet computer, or the like. In addition, the image processing method may also be executed by a server or a server cluster. As illustrated in FIG. 1, the method includes actions at blocks S101 to S104.

At block S101, at least two to-be-synthesized images are obtained. The at least two to-be-synthesized images are images of an object captured at different exposures.

In an embodiment of the present disclosure, the at least two to-be-synthesized images may be captured for the same scene by a camera at different exposure parameters. Therefore, each of the to-be-synthesized images has different image luminance. The camera may be a hardware unit on the terminal device or an independent electronic device connected to the terminal device. The terminal device can obtain the at least two to-be-synthesized images captured by the camera, and the server can also obtain the at least two to-be-synthesized images captured by the camera via a client in the terminal device.

At block S102, an image luminance value of each of the at least two to-be-synthesized images is determined.

The image luminance value may reflect a luminance level of the image. In an embodiment of the present disclosure, a method for determining the image luminance value of one of the to-be-synthesized images is not limited herein.

For example, the image luminance value of one of the to-be-synthesized images may be calculated with a luminance value of each pixel of one of the to-be-synthesized images. In addition, pixels having luminance values within a predetermined luminance value interval may be filtered from one of the to-be-synthesized images, and then the image luminance value of the to-be-synthesized image luminance values can be calculated with the luminance value of the filtered pixels.

At block S103, for each of the at least two to-be-synthesized images, a luminance weight of each pixel of the to-be-synthesized image is determined based on the image luminance value of the to-be-synthesized image and a luminance value of each pixel of the to-be-synthesized image.

Each of the to-be-synthesized images corresponds to one image luminance value, representing a luminance level of the to-be-synthesized image. Each pixel of the to-be-synthesized image corresponds to one luminance value, representing a luminance level of the pixel.

For one of pixels of the to-be-synthesized image, the luminance weight of the pixel is related to the luminance value of the pixel and the image luminance value of the to-be-synthesized image.

In a possible implementation, the closer the luminance value of the pixel is adjacent to the image luminance value of the to-be-synthesized image, the closer the luminance level of the pixel is adjacent to the luminance level of the image, the greater the luminance weight of the pixel is. A proximity degree corresponding to the pixel, i.e., a degree of the luminance value of the pixel adjacent to the image luminance value of the to-be-synthesized image, may be represented by an absolute value of a difference between the luminance value of the pixel and the image luminance value of the to-be-synthesized image.

For example, the image luminance value of the to-be-synthesized image is 50, a luminance value of a pixel a of the to-be-synthesized image is 48, and a luminance value of a pixel b is 55. Since 48 is closer to 50 than 55, a luminance weight of the pixel a is greater than a luminance weight of the pixel b.

In a possible implementation, determining the luminance weight of each pixel of the to-be-synthesized image based on the image luminance value of the to-be-synthesized image and the luminance value of each pixel of the to-be-synthesized image at block S103 may include: determining a first association image of the to-be-synthesized image, in which the first association image is a to-be-synthesized image having an image luminance value adjacent to the image luminance value of the to-be-synthesized image; and determining the luminance weight of each pixel of the to-be-synthesized image based on the image luminance value of the to-be-synthesized image, the image luminance value of the first association image, and the luminance value of each pixel of the to-be-synthesized image.

In an embodiment of the present disclosure, the to-be-synthesized images may be ordered in order of the image luminance values. For one of the to-be-synthesized images, the first association image of the to-be-synthesized image is a to-be-synthesized image having an image luminance value adjacent to the image luminance value of the to-be-synthesized image. The to-be-synthesized image may include one or more first association images. In a case where the to-be-synthesized image is a to-be-synthesized image having a minimum or maximum image luminance value, the to-be-synthesized image includes one first association image. In addition, in a case where the to-be-synthesized image is not the to-be-synthesized image having the minimum image luminance value nor the to-be-synthesized image having the maximum image luminance value, the to-be-synthesized image includes two first association images.

For example, a first to-be-synthesized image to a fifth to-be-synthesized image have image luminance values P1 to P5, respectively, where P1<P2<P3<P4<P5. Each of the first to-be-synthesized image and the fifth to-be-synthesized image includes one first association image. For example, an image luminance value P5 of the fifth to-be-synthesized image is adjacent to an image luminance value P4 of the fourth to-be-synthesized image. As a result, the first association image of the fifth to-be-synthesized image is the fourth to-be-synthesized image. Each of the second to-be-synthesized image, the third to-be-synthesized image, and the fourth to-be-synthesized image includes two first association images. For example, an image luminance value P3 of the third to-be-synthesized image is adjacent to an image luminance value P2 of the second to-be-synthesized image, and the image luminance value P3 of the third to-be-synthesized image is adjacent to the image luminance value P4 of the fourth to-be-synthesized image. As a result, the first association images of the third to-be-synthesized image are the second to-be-synthesized image and fourth the to-be-synthesized image.

In some embodiments, the first association image may be a to-be-synthesized image having an image luminance value adjacent to the image luminance value of the to-be-synthesized image, or all to-be-synthesized images each having an image luminance value adjacent to the image luminance value of the to-be-synthesized image.

In an embodiment of the present disclosure, for each of the to-be-synthesized images, a mapping relationship between luminance and a luminance weight corresponding to the to-be-synthesized image may be determined based on the image luminance value of the to-be-synthesized image and the image luminance value of the first association image of the to-be-synthesized image. On the basis of the mapping relationship, the luminance weight of each pixel of the to-be-synthesized image may be determined based on the luminance value of each pixel of the to-be-synthesized image.

FIG. 2 is a schematic diagram of a mapping relationship between luminance and a luminance weight according to an embodiment of the present disclosure. As illustrated in FIG. 2, P1 to P5 represent respectively the image luminance values of the first to-be-synthesized image to the fifth to-be-synthesized image, where P1<P2<P3<P4<P5. For the third to-be-synthesized image, a mapping relationship between luminance and a luminance weight corresponding to the third to-be-synthesized image in FIG. 2 may be determined based on the image luminance value P2 of the second to-be-synthesized image, the image luminance value P3 of the third to-be-synthesized image, and the image luminance value P4 of the fourth to-be-synthesized image. For each pixel of the third to-be-synthesized image, a luminance weight of the pixel may be determined based on the mapping relationship and the luminance of the pixel.

It should be noted that the mapping relationship between the luminance and the luminance weight corresponding to the third to-be-synthesized image in FIG. 2 is only illustrative. For example, the mapping relationship may be a triangle illustrated in FIG. 2, a trapezoid, or a curve, etc., which is not limited in the present disclosure. In some embodiments, the mapping relationship may be a linear relationship, such as the relationship graph illustrated in FIG. 2.

At block S104, a target image is obtained by performing image synthesis processing based on the luminance value of each pixel of the at least two to-be-synthesized images and the luminance weight of each pixel of the at least two to-be-synthesized images.

In an embodiment of the present disclosure, for each of the to-be-synthesized images, one of the pixels of the to-be-synthesized image has a luminance value and a luminance weight. A luminance adjustment may be performed on each pixel of the to-be-synthesized image through the luminance value and the luminance weight of each pixel of the to-be-synthesized image, to obtain a to-be-synthesized image with adjusted luminance. Then, the at least two adjusted to-be-synthesized images are synthesized into one target image.

Embodiments of the present disclosure provide an image processing method. Compared with the related art, in an embodiment of the present disclosure, for each of the at least two to-be-synthesized images, the luminance weight of each pixel of the to-be-synthesized image is determined based on the image luminance value of the to-be-synthesized image and the luminance value of each pixel of the to-be-synthesized image. Then, the target image is obtained by performing the image synthesis processing based on the luminance value of each pixel of the at least two to-be-synthesized images and the luminance weight of each pixel of the at least two to-be-synthesized images. In this way, the luminance weight of each pixel of each of the to-be-synthesized images is related to the image luminance value of the to-be-synthesized image and the luminance value of each pixel of the to-be-synthesized image. That is, the luminance weight of each pixel of each of the to-be-synthesized images takes the image luminance value of this to-be-synthesized image into account, which can reduce influence of uneven image luminance distribution of the at least two to-be-synthesized images, thereby improving quality of the synthesized image and enhancing user experience.

In another possible implementation of an embodiment of the present disclosure, determining the luminance weight of each pixel of the to-be-synthesized image based on the image luminance value of the to-be-synthesized image, the image luminance value of the first association image of the to-be-synthesized image, and the luminance value of each pixel of the to-be-synthesized image may include actions at blocks S1031 and S1032.

At block S1031, a luminance value interval of each target pixel of the to-be-synthesized image is determined based on the image luminance value of the to-be-synthesized image and the image luminance value of the first association image of the to-be-synthesized image.

The luminance value interval may be an open interval, a closed interval, or a semi-open and semi-closed interval, and the to-be-synthesized image may include one or two the first association images.

In an embodiment of the present disclosure, for the luminance value interval of each target pixel of the to-be-synthesized image, a maximum luminance value in the luminance value interval is equal to or smaller than a maximum one of the image luminance values of the to-be-synthesized images, and a minimum luminance value in the luminance value interval is equal to or greater than a minimum one of the image luminance values of the to-be-synthesized images.

For example, P1 to P5 respectively represent the image luminance values of the first to-be-synthesized image to the fifth to-be-synthesized image, where P1<P2<P3<P4<P5. In this way, the maximum luminance value in the luminance value interval of one of the to-be-synthesized images is not greater than P5, and the minimum luminance value in the luminance value interval of one of the to-be-synthesized images is not smaller than P1.

When the to-be-synthesized image includes one first association image, the luminance value interval may be determined in a manner A1.

In the manner A1, the luminance value interval of each target pixel of the to-be-synthesized image is determined based on the image luminance value of the to-be-synthesized image and the image luminance value of the first association image of the to-be-synthesized image. The determination manner is not limited in the present disclosure.

For example, in an example, determining the luminance value interval of each target pixel of the to-be-synthesized image based on the image luminance value of the to-be-synthesized image and the image luminance value of the first association image at block S1031 may include: determining, as the luminance value interval of each target pixel of the to-be-synthesized image, an interval defined by the image luminance value of the to-be-synthesized image and the image luminance value of the first association image.

The determining manner may be: determining the image luminance value of the to-be-synthesized image and the image luminance value of the first association image of the to-be-synthesized image, then determining as the minimum luminance value in the luminance value interval a smaller one of the image luminance value of the to-be-synthesized image and the image luminance value of the first association image of the to-be-synthesized image, and determine as the maximum luminance value in the luminance value interval a greater one of the image luminance value of the to-be-synthesized image and the image luminance value of the first association image of the to-be-synthesized image. That is, the luminance value interval may be [the smaller image luminance value, the greater image luminance value].

For example, when the image luminance value P1 of the first to-be-synthesized image is smaller than the image luminance value P2 of the second to-be-synthesized image, the image luminance value P1 of the first to-be-synthesized image is determined as the minimum luminance value in the luminance value interval, and the image luminance value P2 of the second to-be-synthesized image is determined as the maximum luminance value in the luminance value interval. That is, the luminance value interval is [P1, P2].

For another example, in another example, the determination manner may be: determining the image luminance value of the to-be-synthesized image and the image luminance value of the first association image of the to-be-synthesized image, and a difference between the image luminance value of the to-be-synthesized image and the image luminance value of the first association image of the to-be-synthesized image; and determining as the minimum luminance value in the luminance value interval a value obtained by subtracting a product of a predetermined value and the difference from the smaller one of the image luminance value of the to-be-synthesized image and the image luminance value of the first association image of the to-be-synthesized image, and determining as the maximum luminance value in the luminance value interval a value obtained by adding a product of a predetermined value and the difference to the greater one of the image luminance value of the to-be-synthesized image and the image luminance value of the first association image of the to-be-synthesized image. The predetermined value is not limited herein. For example, the predetermined value may be 0.1.

For example, when the image luminance value P1 of the first to-be-synthesized image is smaller than the image luminance value P2 of the second to-be-synthesized image and a difference between the two image luminance values is P2−P1, the minimum luminance value may be calculated to be P1−0.1 (P2−P1), and the maximum luminance value is calculated to be P2+0.1 (P2−P1). That is, the luminance value interval is [P1−0.1(P2−P1), P2+0.1(P2−P1)].

When the to-be-synthesized image includes two first association images, the luminance value interval may be determined in a manner A2.

In the manner A2, for each first association image, the luminance value interval corresponding to the first association image may be determined in the manner A1, and then the luminance value interval of each target pixel of the to-be-synthesized image is obtained based on the luminance value intervals corresponding to the two first association images.

For example, when the first association images of the second to-be-synthesized image are the first to-be-synthesized image and the third to-be-synthesized image, the image luminance value P1 of the first to-be-synthesized image is smaller than the image luminance value P2 of the second to-be-synthesized image, and the image luminance value P2 of the second to-be-synthesized image is smaller than the image luminance value P3 of the third to-be-synthesized image, a luminance value interval [P1, P2] corresponding to the first to-be-synthesized image and a luminance value interval [P2, P3] corresponding to the third to-be-synthesized image can be determined in the manner A1. Then, the luminance value interval [P1, P3] of each target pixel of the second to-be-synthesized image is obtained based on the luminance value interval [P1, P2] and the luminance value interval [P2, P3].

For another example, when the first association images of the second to-be-synthesized image are the first to-be-synthesized image and the third to-be-synthesized image, the image luminance value P1 of the first to-be-synthesized image is smaller than the image luminance value P2 of the second to-be-synthesized image, and the image luminance value P2 of the second to-be-synthesized image is smaller than the image luminance value P3 of the third to-be-synthesized image, the luminance value interval $[P1-0.1(P2-P1), P2+0.1(P2-P1)]$ corresponding to the first to-be-synthesized image and the luminance value interval $[P2-0.1(P3-P2), P3+0.1(P3-P2)]$ corresponding to the third to-be-synthesized image can be determined in the manner A1. Then, the luminance value interval $[P1-0.1(P2-P1), P3+0.1(P3-P2)]$ of each target pixel of the second to-be-synthesized image is obtained based on the luminance value interval $[P1-0.1(P2-P1), P2+0.1(P2-P1)]$ and the luminance value interval $[P2-0.1(P3-P2), P3+0.1(P3-P2)]$.

At block S1032, when a luminance value of one of pixels of the to-be-synthesized image is within the luminance value interval, a luminance weight of the pixel is determined based on the image luminance value of the to-be-synthesized image, the image luminance value of the first association image, and the luminance value of the pixel, and when the luminance value of the pixel is beyond the luminance value interval, the luminance weight of the pixel is determined to be a first predetermined value.

Here, the first predetermined value is not limited herein. For example, the first predetermined value may be 0.

In an embodiment of the present disclosure, when the luminance value of one of the pixels of the to-be-synthesized image is within the luminance value interval, a mapping relationship between the luminance and the luminance weight corresponding to the to-be-synthesized image can be determined based on the image luminance value of the to-be-synthesized image and the image luminance value of the first association image of the to-be-synthesized image. Then, the luminance weight of the pixel is determined based on the luminance value of the pixel and the mapping relationship. When the luminance value of the pixel is beyond the luminance value interval, the luminance weight of the pixel is determined to be the first predetermined value. For example, the luminance weight of the pixel is determined to be 0.

In another implementation of an embodiment of the present disclosure, determining the luminance weight of each pixel of the to-be-synthesized image based on the image luminance value of the to-be-synthesized image, the image luminance value of the first association image of the to-be-synthesized image, and the luminance value of each pixel of the to-be-synthesized image may include actions at blocks S1033 and S1034.

At block S1033, a luminance value interval of each target pixel of the to-be-synthesized image is determined based on the image luminance value of the to-be-synthesized image, the image luminance value of the first association image of the to-be-synthesized image, and an image luminance value of a second association image of the to-be-synthesized image.

Here, the second association image is a to-be-synthesized image other than the to-be-synthesized image and having an image luminance value adjacent to the image luminance value of the first association image.

In an embodiment of the present disclosure, the at least two to-be-synthesized images are ordered based on the image luminance value, and the possible orderings will be described in first to fourth examples.

In the first example, when two to-be-synthesized images are provided, one of the two to-be-synthesized images includes one first association image and no second association image.

In the second example, when three to-be-synthesized images are provided, the first or third to-be-synthesized image includes one first association image and one second association image, and the second to-be-synthesized image incudes two first association images and no second association image.

In the third example, when four to-be-synthesized images are provided, the first or fourth to-be-synthesized image includes one first association image and one second association image, and the second or third to-be-synthesized image includes two first association images and one second association image.

In the fourth example, when at least five to-be-synthesized images are provided, the first or the last to-be-synthesized image includes one first association image and one second association image, the second or penultimate to-be-synthesized image includes two first association images and one second association image, and one of other to-be-synthesized images other than the first, second, penultimate and last to-be-synthesized images includes two first association images and two second association images.

For example, the first to-be-synthesized image to the fifth to-be-synthesized image have the image luminance values P1 to P5, where $P1<P2<P3<P4<P5$. In this case, the first association image of the first to-be-synthesized image is the second to-be-synthesized image, and the second association image of the first to-be-synthesized image is the third to-be-synthesized image; the first association image of the fifth to-be-synthesized image is the fourth to-be-synthesized image, and the second association image of the fifth to-be-synthesized image is the third to-be-synthesized image; the first association images of the second to-be-synthesized image are the first to-be-synthesized image and the third to-be-synthesized image, and the second association image of the second to-be-synthesized image is the fourth to-be-synthesized image; the first association images of the fourth to-be-synthesized image are the third to-be-synthesized image and the fifth to-be-synthesized image, and the second association image of the fourth to-be-synthesized image is the second to-be-synthesized image; and the first association images of the third to-be-synthesized image are the second to-be-synthesized image and the fourth to-be-synthesized image, and the second association images of the third to-be-synthesized image are the first to-be-synthesized image and the fifth to-be-synthesized image.

In an example, determining the luminance value interval of each target pixel of the to-be-synthesized image based on the image luminance value of the to-be-synthesized image, the image luminance value of the first association image of the to-be-synthesized image, and the image luminance value of the second association image of the to-be-synthesized image may include actions at blocks S10331 and S10333.

At block S10331, an initial luminance interval of each target pixel of the to-be-synthesized image is determined based on the image luminance value of the to-be-synthesized image and the image luminance value of the first association image.

In an embodiment of the present disclosure, the initial luminance interval may be an open interval, a closed interval, or a semi-open and semi-closed interval. A determination manner of the initial luminance interval is the same as the determination manner of the luminance value interval of each target pixel of the to-be-synthesized image at block S1031. That is, the obtained luminance value interval determined at block S1031 is equivalent to the initial luminance interval, and thus description of the determination manner of the initial luminance interval in detail can made reference to the description at block S1031, and details thereof will be omitted herein.

It should be noted that, when the to-be-synthesized image includes no second association image, the initial luminance interval may be determined as the luminance value interval of each target pixel of the to-be-synthesized image; and when the to-be-synthesized image includes one or two second association images, the luminance value interval of each target pixel of the to-be-synthesized image may be further determined based on the actions at blocks S10332 and S10333.

At block S10332, an extended luminance interval of the initial luminance interval is determined based on the image luminance value of the first association image and the image luminance value of the second association image of the to-be-synthesized image.

The extended luminance interval may be an open interval, a closed interval, or a semi-open and semi-closed interval. The to-be-synthesized image includes one or two second association images.

When the to-be-synthesized image includes one second association image, and the to-be-synthesized image includes one or two the first association images, the extended luminance interval of the to-be-synthesized image may be determined with the first association image having the image luminance value adjacent to the image luminance value of the second association image in the manner B1.

For example, when the first association images of the second to-be-synthesized image are the first to-be-synthesized image and the third to-be-synthesized image, the second association image of the second to-be-synthesized image is the fourth to-be-synthesized image, and the image luminance value of the fourth to-be-synthesized image is adjacent to the image luminance value of the third to-be-synthesized image, an extended luminance interval of the second to-be-synthesized image may be determined with the third to-be-synthesized image and the fourth to-be-synthesized image.

In the manner B1, for the to-be-synthesized image, the extended luminance interval of the to-be-synthesized image is determined with the image luminance value of the first association image having the image luminance value adjacent to the image luminance value of the second association image and the image luminance value of the second association image of the to-be-synthesized image, and the determination manner is not limited herein.

For example, a relationship between the image luminance value of the first association image of the to-be-synthesized image and the image luminance value of the second association image of the to-be-synthesized image may be determined first, then a smaller one of the image luminance value of the first association image and the image luminance value of the second association image is determined as a minimum luminance value in the extended luminance interval, and a greater one of the image luminance value of the first association image and the image luminance value of the second association image is determined as a maximum luminance value in the extended luminance interval. That is, the extended luminance interval may be [the smaller image luminance value, the greater image luminance value].

For example, when the first association image of the first to-be-synthesized image is the second to-be-synthesized image, the second association image of the first to-be-synthesized image is the third to-be-synthesized image, and the image luminance value P2 of the second to-be-synthesized image is smaller than the image luminance value P3 of the third to-be-synthesized image, the extended luminance interval may be [P2, P3].

For another example, determining the extended luminance interval of the initial luminance interval based on the image luminance value of the first association image and the image luminance value of the second association image of the to-be-synthesized image at block S10332 may include: determining a difference between the image luminance value of the first association image and the image luminance value of the second association image of the to-be-synthesized image; and determining the extended luminance interval of the initial luminance interval based on the difference and a third predetermined value.

In response to determining that the image luminance value of the first association image is greater than the image luminance value of the second association image, a value obtained by subtracting a product of a difference between the image luminance value of the first association image and the image luminance value of the second association image and the third predetermined value from the image luminance value of the first association image is determined as the minimum luminance value in the extended luminance interval, and the image luminance value of the first association image is determined as the maximum luminance value in the extended luminance interval. In addition, in response to determining that the image luminance value of the first association image is smaller than the image luminance value of the second association image, the image luminance value of the first association image is determined as the minimum luminance value in the extended luminance interval, and a value obtained by adding the produce of the difference between the image luminance value of the first association image and the image luminance value of the second association image and the third predetermined value to the image luminance value of the first association image is determined as the maximum luminance value in the extended luminance interval.

It should be noted that the third predetermined value is not limited in the present disclosure. For example, the third predetermined value may be 0.3.

For example, when the first association image of the first to-be-synthesized image is the second to-be-synthesized image, the second association image of the first to-be-synthesized image is the third to-be-synthesized image, and the image luminance value P2 of the second to-be-synthesized image is smaller than the image luminance value P3 of the third to-be-synthesized image, the image luminance value P2 of the second to-be-synthesized image is determined as the minimum luminance value in the extended luminance interval. On the basis of the difference of P3–P2, the third predetermined value of 0.3, and the image luminance value P2 of the second to-be-synthesized image, the maximum luminance value in the extended luminance interval is determined to be P2+0.3 (P3–P2). That is, the extended luminance interval is [P2, P2+0.3 (P3–P2)].

When the to-be-synthesized image includes two second association images, the extended luminance interval may be determined in a manner B2.

In the manner B2, for each first association image, the extended luminance interval corresponding to the first association image may be determined in the manner B1. Then, the extended luminance intervals corresponding to the two first association images are determined as the extended luminance interval of the initial luminance interval.

For example, when the first to-be-synthesized image to fifth to-be-synthesized image have the image luminance values of P1 to P5, where P1<P2<P3<P4<P5, the first association images of the third to-be-synthesized image are the second to-be-synthesized image and the fourth to-be-synthesized image, and the second association images of the third to-be-synthesized image are the first to-be-synthesized image and the fifth to-be-synthesized image. The extended luminance interval [P1, P2] corresponding to the second to-be-synthesized image and the extended luminance interval [P4, P5] corresponding to the fourth to-be-synthesized image can be determined in the manner B1. Therefore, the extended luminance interval of the initial luminance interval includes the extended luminance interval [P1, P2] and the extended luminance interval [P4, P5].

For another example, when the first to-be-synthesized image to fifth to-be-synthesized image have the image luminance values of P1 to P5, where P1<P2<P3<P4<P5, the first association images of the third to-be-synthesized image are the second to-be-synthesized image and the fourth to-be-synthesized image, and the second association images of the third to-be-synthesized image are the first to-be-synthesized image and the fifth to-be-synthesized image. The extended luminance interval [P2–0.3 (P2–P1), P2] corresponding to the second to-be-synthesized image and the extended luminance interval [P4, P4+0.3 (P5–P4)] corresponding to the fourth to-be-synthesized image can be determined in the manner B1. Therefore, the extended luminance interval of the initial luminance interval includes the extended luminance interval [P2–0.3 (P2–P1), P2] and the extended luminance interval [P4, P4+0.3 (P5–P4)].

At block S10333, the luminance value interval of each target pixel of the to-be-synthesized image is obtained by stitching the initial luminance interval and the extended luminance interval.

In an embodiment of the present disclosure, the initial luminance interval and the extended luminance interval may be stitched to obtain the luminance value interval of each target pixel of the to-be-synthesized image.

For example, for the when the initial luminance interval of the first to-be-synthesized image is [P1, P2] and the extended luminance interval of the first to-be-synthesized image is [P2, P2+0.3 (P3–P2)], the initial luminance interval [P1, P2] and the extended luminance interval [P2, P2+0.3 (P3–P2)] may be stitched into [P1, P2+0.3 (P3–P2)], which is determined as the luminance value interval of each target pixel of the first to-be-synthesized image.

For another example, when the initial luminance interval of the third to-be-synthesized image is [P2, P4] and the extended luminance intervals of the third to-be-synthesized image are [P2–0.3 (P2–P1), P2] and [P4, P4+0.3 (P5–P4)], then the initial luminance interval [P2, P4] and the extended luminance intervals [P2–0.3 (P2–P1), P2] and [P4, P4+0.3 (P5–P4)] are stitched into [P2–0.3 (P2–P1), P4+0.3 (P5–P4)], which is determined as the luminance value interval of each target pixel point of the third to-be-synthesized image.

In an embodiment of the present disclosure, for the luminance value interval of each target pixel of the to-be-synthesized image, the maximum luminance value in the luminance value interval is not greater than a maximum one of the image luminance values of the to-be-synthesized images, and the minimum luminance value in the luminance value interval is not smaller than the minimum one of the image luminance values of the to-be-synthesized images.

For example, P1 to P5 represent respectively the image luminance values of the first to-be-synthesized image to fifth to-be-synthesized image, where P1<P2<P3<P4<P5, and thus the maximum luminance value in the luminance value interval of each of the to-be-synthesized images is not greater than the image luminance value P5 of the fifth to-be-synthesized image, and the minimum luminance value in the luminance value interval of each of the to-be-synthesized images is not smaller than the image luminance value P1 of the first to-be-synthesized image.

At block S1034, for one of the pixels of the to-be-synthesized image, when the luminance value of the pixel is within the luminance value interval, the luminance weight of the pixel is determined based on the image luminance value of the to-be-synthesized image, the image luminance value of the first association image of the to-be-synthesized image, the image luminance value of the second association image of the to-be-synthesized image, and the luminance value of the pixel. When the luminance value of the pixel is beyond the luminance value interval, the luminance weight of the pixel is determined to be the second predetermined value.

The second predetermined value is not limited in the present disclosure. For example, the second predetermined value may be 0.

In an embodiment of the present disclosure, for one of the pixels of each of the to-be-synthesized images, when the luminance value of the pixel is within the luminance value interval, the mapping relationship between the luminance and the luminance weight corresponding to the to-be-synthesized image may be determined based on the image luminance value of the to-be-synthesized image, the image luminance value of the first association image of the to-be-synthesized image, and the image luminance value of the second association image of the to-be-synthesized image. Then, the luminance weight of the pixel is determined based on the luminance value of the pixel and the mapping relationship. When the luminance value of the pixel is beyond the luminance value interval, the luminance weight of the pixel is determined to be the second predetermined value. For example, the luminance weight of the pixel is determined to be 0.

FIG. 3 is a schematic diagram of another mapping relationship between luminance and a luminance weight according to an embodiment of the present disclosure. As illustrated in FIGS. 3, P1 to P5 represent respectively the image luminance values of the first to-be-synthesized image to the fifth to-be-synthesized image, where P1<P2<P3<P4<P5, P2–N1=0.3*(P2–P1), N2–P4=0.3*(P5–P4). For the third to-be-synthesized image, a mapping relationship between luminance and a luminance weight corresponding to the third to-be-synthesized image in FIG. 3 can be determined based on the image luminance values P1 to P5 of the first to-be-synthesized image to the fifth to-be-synthesized image. For each pixel of the third to-be-synthesized image, the luminance weight of the pixel may be determined based on the mapping relationship and the luminance of the pixel.

It should be noted that the mapping relationship between the luminance and the luminance weight corresponding to the third to-be-synthesized image in FIG. 3 is only illustrative. For example, the mapping relationship may be a triangle illustrated in FIG. 3, a trapezoid, or a curve, etc., which is not limited in the present disclosure.

In order to better understand and explain the present disclosure, the present disclosure will be described in detail below with reference to an exemplary embodiment. In an embodiment of the present disclosure taking three to-be-synthesized images combined with FIG. 4 as an example. FIG. 4 is a schematic diagram of yet another mapping relationship between luminance and a luminance weight according to an embodiment of the present disclosure.

First, three to-be-synthesized images are obtained and are referred to as a first to-be-synthesized image, a second to-be-synthesized image, and a third to-be-synthesized image, respectively. An image luminance value of each of the three to-be-synthesized images is determined. Further, the image luminance value of the first to-be-synthesized image is P1, the image luminance value of the second to-be-synthesized image is P2, and the image luminance value of the third to-be-synthesized image is P3.

For each of the to-be-synthesized images, the luminance weight of each pixel of the to-be-synthesized image is determined based on the image luminance value of the to-be-synthesized image and the image luminance value of the first association image of the to-be-synthesized image. The first association image is a to-be-synthesized image having an image luminance value adjacent to the image luminance value of the to-be-synthesized image.

In some embodiments, a mapping relationship between the luminance of the pixel corresponding to the first to-be-synthesized image and the luminance weight of the pixel as illustrated in FIG. 4 may be determined based on the image luminance value of the first to-be-synthesized image P1 and the image luminance value of the second to-be-synthesized image P2, and for each pixel of the first to-be-synthesized image, the luminance weight of the pixel may be obtained based on the luminance of the pixel and the mapping relationship. Correspondingly, a mapping relationship between the luminance of the pixel and the luminance weight of the pixel corresponding to the second to-be-synthesized image as illustrated in FIG. 4 may be determined based on the image luminance value P1 of the first to-be-synthesized image, the image luminance value P2 of the second to-be-synthesized image, and the image luminance value P3 of the third to-be-synthesized image, and for each pixel of the second to-be-synthesized image, the luminance weight of the pixel can be obtained based on the luminance of the pixel and the mapping relationship. A mapping relationship between the luminance of the pixel and the luminance weight of the pixel corresponding to the third to-be-synthesized image as illustrated in FIG. 4 may be determined based on the image luminance value P2 of the second to-be-synthesized image and the image luminance value P3 of the third to-be-synthesized image, and for each pixel of the third to-be-synthesized image, the luminance weight of the pixel may be obtained based on the luminance of the pixel and the mapping relationship.

Further, the target image is obtained by performing the image synthesis processing based on the luminance value and the luminance weight of each pixel of the three to-be-synthesized images.

For some implementations of the present disclosure, reference may be made to the related description of the above embodiments, and description thereof in detail will be omitted herein.

The embodiments of the image processing method are described above in detail by means of method steps. Further, an image processing apparatus will be described below by means of virtual modules.

Figure 5:
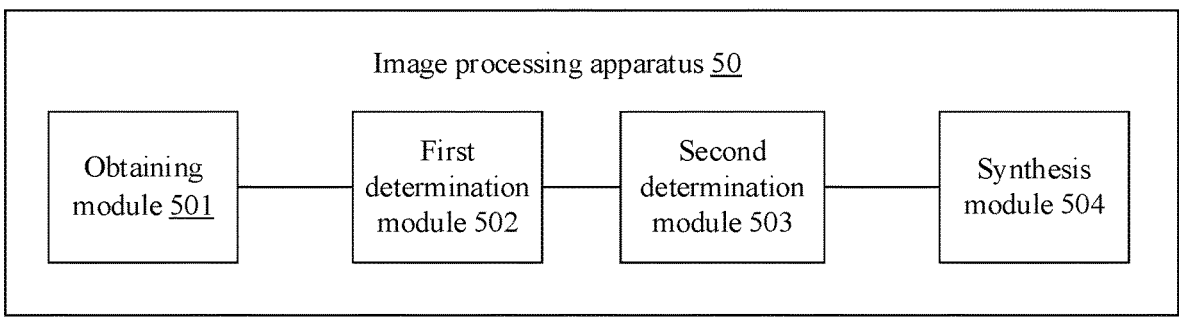
FIG. 5 is a schematic structural diagram of an image processing apparatus according to an embodiment of the present disclosure.

An embodiment of the present disclosure provides an image processing apparatus. As illustrated in FIG. 5, the image processing apparatus 50 may include an obtaining module 501, a first determination module 502, a second determining module 503, and a synthesis module 504.

The obtaining module 501 is configured to obtain at least two to-be-synthesized images. The at least two to-be-synthesized images is images of an object captured at different exposures.

The first determination module 502 is configured to determine an image luminance value of each of the at least two to-be-synthesized images.

The second determining module 503 is configured to determine, for each of the at least two to-be-synthesized images, a luminance weight of each pixel of the to-be-synthesized image based on the image luminance value of the to-be-synthesized image and a luminance value of each pixel of the to-be-synthesized image.

The synthesis module 504 is configured to obtain a target image by performing image synthesis processing based on the luminance value of each pixel of the at least two to-be-synthesized images and the luminance weight of each pixel of the at least two to-be-synthesized images.

In another possible implementation of an embodiment of the present disclosure, the second determining module 503 is further configured to, when determining the luminance weight of each pixel of the to-be-synthesized image based on the image luminance value of the to-be-synthesized image and the luminance value of each pixel of the to-be-synthesized image: determine a first association image of the to-be-synthesized image, and determine the luminance weight of each pixel of the to-be-synthesized image based on the image luminance value of the to-be-synthesized image, the image luminance value of the first association image, and the luminance value of each pixel of the to-be-synthesized image. The first association image is a to-be-synthesized image having an image luminance value adjacent to the image luminance value of the to-be-synthesized image.

In another embodiment of the present disclosure, the second determining module 503 is further configured to, when determining the luminance weight of each pixel of the to-be-synthesized image based on the image luminance value of the to-be-synthesized image, the image luminance value of the first association image of the to-be-synthesized image, and the luminance value of each pixel of the to-be-synthesized image: determine a luminance value interval of each target pixel of the to-be-synthesized image based on the image luminance value of the to-be-synthesized image and the image luminance value of the first association image of the to-be-synthesized image; determine, when a luminance value of one of pixels of the to-be-synthesized image is within the luminance value interval, a luminance weight of the pixel based on the image luminance value of the to-be-synthesized image, the image luminance value of the first association image of the to-be-synthesized image, and the luminance value of the pixel; and determine, when the luminance value of the pixel is beyond the luminance value interval, the luminance weight of the pixel to be a first predetermined value.

In another embodiment of the present disclosure, the second determining module 503 is further configured to, when determining the luminance value interval of each target pixel of the to-be-synthesized image based on the image luminance value of the to-be-synthesized image and the image luminance value of the first association image of the to-be-synthesized image: determine, as the luminance value interval of each target pixel of the to-be-synthesized image, an interval defined by the image luminance value of the to-be-synthesized image and the image luminance value of the first association image of the to-be-synthesized image.

In another embodiment of the present disclosure, the second determining module 503 is further configured to, when determining the luminance weight of each pixel of the to-be-synthesized image based on the image luminance value of the to-be-synthesized image, the image luminance value of the first association image of the to-be-synthesized image, and the luminance value of each pixel of the to-be-synthesized image: determine a luminance value interval of each target pixel of the to-be-synthesized image based on the image luminance value of the to-be-synthesized image, the image luminance value of the first association image of the to-be-synthesized image, and an image luminance value of a second association image of the to-be-synthesized image; determine, when a luminance value of one of pixels of the to-be-synthesized image is within the luminance value interval, a luminance weight of the pixel based on the image luminance value of the to-be-synthesized image, the image luminance value of the first association image of the to-be-synthesized image, the image luminance value of the second association image of the to-be-synthesized image, and the luminance value of the pixel; and determining, when the luminance value of the pixel is beyond the luminance value interval, the luminance weight of the pixel to be a second predetermined value. The second association image is a to-be-synthesized image other than the to-be-synthesized image and having the image luminance value adjacent to the image luminance value of the first association image.

In another embodiment of the present disclosure, the second determining module 503 is further configured to, when determining the luminance value interval of each target pixel of the to-be-synthesized image based on the image luminance value of the to-be-synthesized image, the image luminance value of the first association image of the to-be-synthesized image, and the image luminance value of the second association image of the to-be-synthesized image: determine an initial luminance interval of each target pixel of the to-be-synthesized image based on the image luminance value of the to-be-synthesized image and the image luminance value of the first association image of the to-be-synthesized image; determine an extended luminance interval of the initial luminance interval based on the image luminance value of the first association image of the to-be-synthesized image and the image luminance value of the second association image of the to-be-synthesized image; and obtain the luminance value interval of each target pixel of the to-be-synthesized image by stitching the initial luminance interval and the extended luminance interval.

In another embodiment of the present disclosure, the second determining module 503 is further configured to, when determining the extended luminance interval of the initial luminance interval based on the image luminance value of the first association image of the to-be-synthesized image and the image luminance value of the second association image of the to-be-synthesized image: determine a difference between the image luminance value of the first association image of the to-be-synthesized image and the image luminance value of the second association image of the to-be-synthesized image; and determine the extended luminance interval of the initial luminance interval based on the difference and a third predetermined value.

In another embodiment of the present disclosure, for the luminance value interval of each target pixel of the to-be-synthesized image, a maximum value in the luminance value interval is not greater than a maximum one of the image luminance values of the to-be-synthesized images; and a minimum luminance value in the luminance value interval is not smaller than a minimum one of the image luminance value of the to-be-synthesized images.

In the embodiments of the present disclosure, the first determining module 502 and the second determining module 503 may be one same determining module or two different determining modules, and the present disclosure is not limited in this regard.

The image processing apparatus according to the embodiments can implement the image processing method according to the above embodiments of the present disclosure. Implementation principles of the apparatus are similar to those of the method, and thus description thereof in detail is omitted herein.

The embodiments of the present disclosure provide the image processing apparatus. Compared with the related art, in the embodiments of the present disclosure, for each of the to-be-synthesized images, the luminance weight of each pixel of the to-be-synthesized image is determined based on the image luminance value of the to-be-synthesized image and the luminance value of each pixel of the to-be-synthesized image. Then, the target image is obtained by performing the image synthesis processing based on the luminance value of each pixel of the at least two to-be-synthesized images and the luminance weight of each pixel of the at least two to-be-synthesized images. In this way, the luminance weight of each pixel of each of the to-be-synthesized images is related to the image luminance value of the to-be-synthesized image and the luminance value of each pixel of the to-be-synthesized image. That is, the luminance weight of each pixel of each of the to-be-synthesized images takes the image luminance value of this to-be-synthesized image into account, which can reduce influence of uneven image luminance distribution of the at least two to-be-synthesized images, thereby improving quality of the synthesized image and enhancing user experience.

The image processing apparatus according to the embodiments of the present disclosure are described above by means of the virtual modules. Further, an electronic device according to embodiments of the present disclosure will be described below by means of a physical device.

Figure 6:
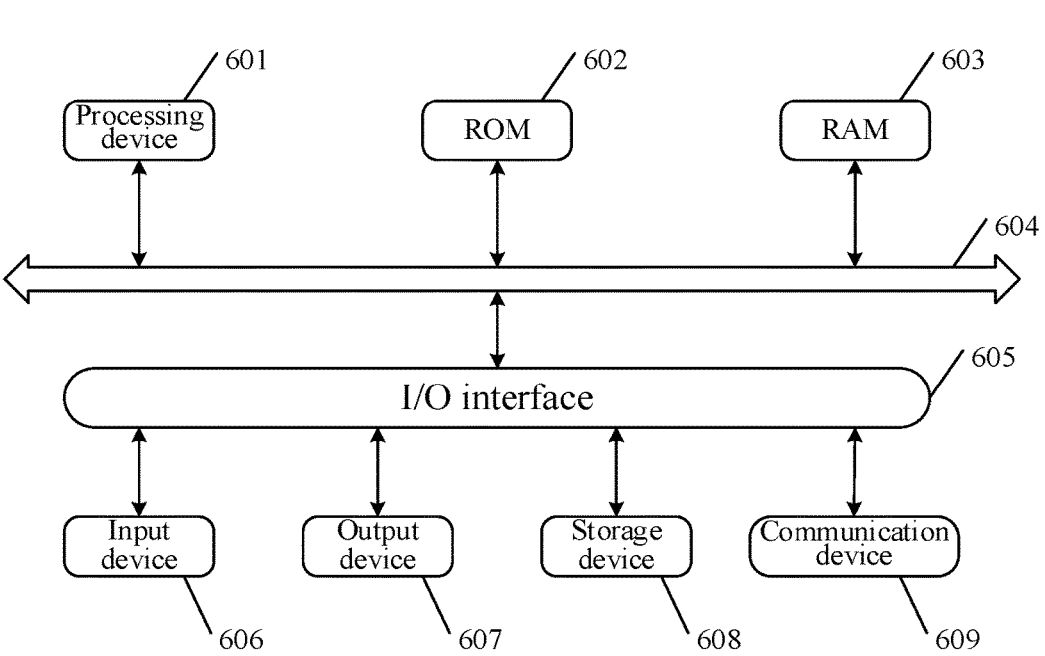
FIG. 6 is a schematic structural diagram of an electronic device according to an embodiment of the present disclosure.

FIG. 6 is a schematic structural diagram of an electronic device (e.g., a terminal device or server in FIG. 1) 600 suitable for implementing embodiments of the present disclosure. The terminal device according to the embodiment of the present disclosure may include, but not limited to, a mobile terminal such as a mobile phone, a laptop computer, a digital broadcast receiver, a personal digital assistant (PDA), a portable Android device (PAD), a Portable Multimedia Player (PMP), or a vehicle-mounted terminal (e.g., a vehicle-mounted navigation terminal), or a fixed terminal such as a digital TV, a desktop computer, etc. The electronic device illustrated in FIG. 6 is exemplary only, and should not be construed as limiting the function and use scope of the embodiments of the present disclosure.

The electronic device includes a memory and a processor. The processor herein may be referred to as a processing device 601 hereinafter, and the memory may include at least one of a Read Only Memory (ROM) 602, a Random Access Memory (RAM) 603, and a storage device 608, which will be described in detail below.

As illustrated in FIG. 6, the electronic device 600 may include a processing device 601 (e.g., a central processing unit, a graphics processor, etc.), which can perform various appropriate actions and processes in accordance with programs stored in the ROM 602 or loaded into the RAM 603 from the storage device 608. Various programs and data required for operation of the electronic device 600 may also be stored on the RAM 603. The processing device 601, the ROM 602, and the RAM 603 are connected to each other through a bus 604. An input/output (I/O) interface 605 is also connected to the bus 604.

Generally, connected to the I/O interface 605 may include: an input device 606 including for example a touch screen, a touch pad, a keyboard, a mouse, a camera, a microphone, an accelerometer, a gyroscope, etc.; an output device 607 including for example a Liquid Crystal Display (LCD), a speaker, a vibrator, and the like; a storage device 608 including for example a magnetic tape, a hard disk, etc.; and a communication device 609. The communication device 609 can allow the electronic apparatus 600 to perform wireless or wired communication with other devices for data exchange. Although FIG. 6 illustrates the electronic device 600 having various mean, it can be appreciated that it is not necessary to implement or provide all the illustrated means. In an example, more or fewer means may be implemented or provided.

According to an embodiment of the present disclosure, the processes described above with reference to the flowcharts may be implemented as computer software programs. For example, an embodiment of the present disclosure provides a computer program product, which includes a computer program carried on a non-transitory computer-readable medium. The computer program includes program codes for implementing the method illustrated by the flowcharts. In these embodiments, the computer program may be downloaded from a network through the communication device 609 and installed, or installed from the storage device 608, or installed from the ROM 602. When the computer program is executed by the processing device 601, the above-mentioned functions defined in the method as described in the embodiments of the present disclosure are performed.

It is to be noted that the above computer-readable medium according to the embodiments of the present disclosure may be a computer-readable signal medium, a computer-readable storage medium, or any combination thereof. The computer-readable storage medium may be, but not limited to, for example, an electrical, magnetic, optical, electromagnetic, infrared, or semiconductor system, apparatus, or device, or any combination thereof. In some examples, the computer-readable storage medium may include, but not limited to, an electrical connection having one or more wires, a portable computer disk, a hard disk, a Random Access Memory (RAM), a Read Only Memory (ROM), an Erasable Programmable Read Only Memory (EPROM) or a flash memory, an optical fiber, a Compact Disc Read-Only Memory (CD-ROM), an optical memory device, a magnetic memory device, or any suitable combination thereof. In the present disclosure, the computer-readable storage medium may be any tangible medium including or having programs thereon, which may be used by or used with an instruction execution system, apparatus, or device. However, in the present disclosure, the computer-readable signal medium may include a data signal propagated in a baseband or as a part of a carrier carrying computer-readable program codes. Such propagated data signal may be in various forms including, but not limited to, an electromagnetic signal, an optical signal, or any suitable combination thereof. The computer-readable signal medium may also be any computer-readable medium other than the computer-readable storage medium. The computer-readable signal medium can transmit, propagate, or transfer programs used by or used with an instruction execution system, apparatus or device. The program codes contained on the computer-readable medium may be transmitted via any appropriate medium including, but not limited to, an electric cable, an optical cable, Radio Frequency (RF), or any suitable combination thereof.

In some embodiments, a client and a server may communicate using any currently known or future-developed network protocol such as HTTP (HyperText Transfer Protocol), and may be in communication interconnection with digital data in any form or medium (e.g., a communication network). Examples of communication networks include a Local Area Network ("LAN"), a Wide Area Network ("WAN"), an Internet work (e.g., the Internet), and an end-to-end network (e.g., ad hoc end-to-end network), as well as any currently known or future-developed networks.

The above-mentioned computer readable medium may be contained in the above-mentioned electronic device, or it may be separated and not equipped into the electronic device.

The above-mentioned computer readable medium can carry one or more programs which, when executed by the electronic device, cause the electronic device to: obtain at least two to-be-synthesized images, in which the at least two to-be-synthesized images are images of an object captured at different exposures; determine an image luminance value of each of the at least two to-be-synthesized images; determine, for each of the at least two to-be-synthesized images, a luminance weight of each pixel of the to-be-synthesized image based on the image luminance value of the to-be-synthesized image and a luminance value of each pixel of the to-be-synthesized image; and obtain a target image by performing image synthesis processing based on the luminance value of each pixel of the at least two to-be-synthesized images and the luminance weight of each pixel of the at least two to-be-synthesized images.

The computer program codes for implementing the operations according to the embodiments of the present disclosure may be written in one or more programming languages or any combination thereof. The programming languages may include object-oriented programming languages, such as Java, Smalltalk, or C++, as well as conventional procedure-oriented programming languages, such as "C" language or similar programming languages. The program codes may be executed completely on a user computer, partly on the user computer, as a standalone software package, partly on the user computer and partly on a remote computer, or completely on the remote computer or server. In a case where the remote computer is involved, the remote computer may be connected to the user computer through any types of network, including a Local Area Network (LAN) or a Wide Area Network (WAN), or to an external computer (e.g., over the Internet by using an Internet service provider).

The flowcharts and block diagrams in the accompanying drawings illustrate architectures, functions, and operations of possible implementations of systems, methods, and computer program products according to various embodiments of the present disclosure. In this regard, each block in the flowcharts or block diagrams may represent a module, a program segment, or a part of codes. The module, program segment, or part of codes may contain one or more executable instructions for implementing a specified logical function. It should also be noted that, in some alternative implementations, the functions showed in blocks may occur in an order other than the order illustrated in the drawings. For example, two blocks illustrated in succession may actually be executed substantially in parallel with each other, or sometimes even in a reverse order, depending on functions involved. It should also be noted that each block in the block diagrams and/or flowcharts, or any combination of the blocks in the block diagrams and/or flowcharts, may be implemented using a dedicated hardware-based system configured to perform specified functions or operations or may be implemented using a combination of dedicated hardware and computer instructions.

The modules or units described in the embodiments of the present disclosure may be embodied as software or hardware. Here, names of the modules or units do not constitute a limitation on the modules or units under certain circumstances. For example, the obtaining module can also be described as "a module configured to obtain at least two to-be-synthesized images".

The functions described herein above may be performed, at least in part, by one or more hardware logic components. For example, without limitation, exemplary types of suitable hardware logic components include a Field Programmable Gate Array (FPGA), an Application Specific Integrated Circuit (ASIC), an Application Specific Standard Product (ASSP), a System-on-Chip (SOC), a Complex Programmable Logic Device (CPLD), and the like.

In the context of this disclosure, a machine-readable medium may be a tangible medium, which may contain or have a program for use thereon by or in connection with an instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination thereof. In some example, the machine-readable storage medium may include an electrical connection based on one or more wires, a portable computer disk, a hard disk, a Random Access Memory (RAM), a Read Only Memory (ROM), an Erasable Programmable Read Only Memory (EPROM) or flash memory, an optical fiber, a Compact Disc Read Only Memory (CD-ROM), an optical memory device, a magnetic memory device, or any suitable combination thereof.

An embodiment of the present disclosure provides an electronic device. The electronic device according to this embodiment of the present disclosure includes one or more processors, a memory, and one or more applications. The one or more applications are stored in the memory and configured to be executed by the one or more processors to perform the image processing method as describe in the above embodiments.

The electronic device according to the embodiments of the present disclosure is described above by means of physical device. Further, a computer-readable medium according to embodiments of the present disclosure will be described below by means of a medium.

An embodiment of the present disclosure provides a computer-readable medium. The computer-readable medium has a computer program stored thereon. The computer program, when executed on a computer, causes the computer to perform the steps as described in the above method embodiments.

According to an embodiment of the present disclosure, there is provided an image processing method including: obtaining at least two to-be-synthesized images, the at least two to-be-synthesized images being images of an object captured at different exposures; determining an image luminance value of each of the at least two to-be-synthesized images; determining, for each of the at least two to-be-synthesized images, a luminance weight of each pixel of the to-be-synthesized image based on the image luminance value of the to-be-synthesized image and a luminance value of each pixel of the to-be-synthesized image; and obtaining a target image by performing image synthesis processing based on the luminance value of each pixel of the at least two to-be-synthesized images and the luminance weight of each pixel of the at least two to-be-synthesized images.

According to one or more embodiments of the present disclosure, determining the luminance weight of each pixel of the to-be-synthesized image based on the image luminance value of the to-be-synthesized image and the luminance value of each pixel of the to-be-synthesized image includes: determining a first association image of the to-be-synthesized image; and determining the luminance weight of each pixel of the to-be-synthesized image based on the image luminance value of the to-be-synthesized image, the image luminance value of the first association image, and the luminance value of each pixel of the to-be-synthesized image. The first association image is a to-be-synthesized image having image luminance value adjacent to the image luminance value of the to-be-synthesized image.

According to one or more embodiments of the present disclosure, determining the luminance weight of each pixel of the to-be-synthesized image based on the image luminance value of the to-be-synthesized image, the image luminance value of the first association image, and the luminance value of each pixel of the to-be-synthesized image includes: determining a luminance value interval of each target pixel of the to-be-synthesized image based on the image luminance value of the to-be-synthesized image and the image luminance value of the first association image; determining, when a luminance value of one of pixels of the to-be-synthesized image is within the luminance value interval, a luminance weight of the pixel based on the image luminance value of the to-be-synthesized image, the image luminance value of the first association image, and the luminance value of the pixel; and determining, when the luminance value of the pixel is beyond the luminance value interval, the luminance weight of the pixel to be a first predetermined value.

According to one or more embodiments of the present disclosure, determining the luminance value interval of each target pixel of the to-be-synthesized image based on the image luminance value of the to-be-synthesized image and the image luminance value of the first association image includes: determining, as the luminance value interval of each target pixel of the to-be-synthesized image, an interval defined by the image luminance value of the to-be-synthesized image and the image luminance value of the first association image.

According to one or more embodiments of the present disclosure, determining the luminance weight of each pixel of the to-be-synthesized image based on the image luminance value of the to-be-synthesized image, the image luminance value of the first association image, and the luminance value of each pixel of the to-be-synthesized image includes: determining a luminance value interval of each target pixel of the to-be-synthesized image based on the image luminance value of the to-be-synthesized image, the image luminance value of the first association image, and an image luminance value of a second association image of the to-be-synthesized image; determining, when a luminance value of one of pixels of the to-be-synthesized image is within the luminance value interval, a luminance weight of the pixel based on the image luminance value of the to-be-synthesized image, the image luminance value of the first association image, the image luminance value of the second association image, and the luminance value of the pixel; and determining, when the luminance value of the pixel is beyond the luminance value interval, the luminance weight of the pixel to be a second predetermined value. The second association image is a to-be-synthesized image other than the to-be-synthesized image and having an image luminance value adjacent to the image luminance value of the first association image.

According to one or more embodiments of the present disclosure, determining the luminance value interval of each target pixel of the to-be-synthesized image based on the image luminance value of the to-be-synthesized image, the image luminance value of the first association image, and the image luminance value of the second association image of the to-be-synthesized image includes: determining an initial luminance interval of each target pixel of the to-be-synthesized image based on the image luminance value of the to-be-synthesized image and the image luminance value of the first association image; determining an extended luminance interval of the initial luminance interval based on the image luminance value of the first association image and the image luminance value of the second association image of the to-be-synthesized image; and obtaining the luminance value interval of each target pixel of the to-be-synthesized image by stitching the initial luminance interval and the extended luminance interval.

According to one or more embodiments of the present disclosure, determining the extended luminance interval of the initial luminance interval based on the image luminance value of the first association image and the image luminance value of the second association image of the to-be-synthesized image includes: determining a difference between the image luminance value of the first association image and the image luminance value of the second association image of the to-be-synthesized image; and determining the extended luminance interval of the initial luminance interval based on the difference and a third predetermined value.

According to one or more embodiments of the present disclosure, for the luminance value interval of each target pixel of the to-be-synthesized image, a maximum luminance value in the luminance value interval is equal to or smaller than a maximum one of the image luminance values of the at least two to-be-synthesized images, and a minimum luminance value in the luminance value interval is equal to or greater than a minimum one of the image luminance values of the at least two to-be-synthesized images.

According to one or more embodiments of the present disclosure, there is provided an image processing apparatus including: an obtaining module configured to obtain at least two to-be-synthesized images, the at least two to-be-synthesized images being images of an object captured at different exposures; a first determining module configured to determine an image luminance value of each of the at least two to-be-synthesized images; a second determining module configured to determine, for each of the at least two to-besynthesized images, a luminance weight of each pixel of the to-be-synthesized image based on the image luminance value of the to-be-synthesized image and a luminance value of each pixel of the to-be-synthesized image; and a synthesis module configured to obtain a target image by performing image synthesis processing based on the luminance value of each pixel of the at least two to-be-synthesized images and the luminance weight of each pixel of the at least two to-be-synthesized images.

According to one or more embodiments of the present disclosure, determining, by the second determination module, the luminance weight of each pixel of the to-be-synthesized image based on the image luminance value of the to-be-synthesized image and the luminance value of each pixel of the to-be-synthesized image includes: determining a first association image of the to-be-synthesized image; and determining the luminance weight of each pixel of the to-be-synthesized image based on the image luminance value of the to-be-synthesized image, the image luminance value of the first association image, and the luminance value of each pixel of the to-be-synthesized image. The first association image is a to-be-synthesized image having image luminance value adjacent to the image luminance value of the to-be-synthesized image.

According to one or more embodiments of the present disclosure, the second determining module is further configured to, when determining the luminance weight of each pixel of the to-be-synthesized image based on the image luminance value of the to-be-synthesized image, the image luminance value of the first association image, and the luminance value of each pixel of the to-be-synthesized image: determine a luminance value interval of each target pixel of the to-be-synthesized image based on the image luminance value of the to-be-synthesized image and the image luminance value of the first association image; determine, when a luminance value of one of pixels of the to-be-synthesized image is within the luminance value interval, a luminance weight of the pixel based on the image luminance value of the to-be-synthesized image, the image luminance value of the first association image, and the luminance value of the pixel; and determine, when the luminance value of the pixel is beyond the luminance value interval, the luminance weight of the pixel to be a first predetermined value.

According to one or more embodiments of the present disclosure, the second determining module is further configured to, when determining the luminance value interval of each target pixel of the to-be-synthesized image based on the image luminance value of the to-be-synthesized image and the image luminance value of the first association image: determining, as the luminance value interval of each target pixel of the to-be-synthesized image, an interval defined by the image luminance value of the to-be-synthesized image and the image luminance value of the first association image.

According to one or more embodiments of the present disclosure, the second determining module is further configured to, when determining the luminance weight of each pixel of the to-be-synthesized image based on the image luminance value of the to-be-synthesized image, the image luminance value of the first association image, and the luminance value of each pixel of the to-be-synthesized image: determine a luminance value interval of each target pixel of the to-be-synthesized image based on the image luminance value of the to-be-synthesized image, the image luminance value of the first association image, and an image luminance value of a second association image of the to-be-synthesized image; determine, when a luminance value of one of pixels of the to-be-synthesized image is within the luminance value interval, a luminance weight of the pixel based on the image luminance value of the to-be-synthesized image, the image luminance value of the first association image, the image luminance value of the second association image, and the luminance value of the pixel; and determine, when the luminance value of the pixel is beyond the luminance value interval, the luminance weight of the pixel to be a second predetermined value. The second association image is a to-be-synthesized image other than the to-be-synthesized image and having an image luminance value adjacent to the image luminance value of the first association image.

According to one or more embodiments of the present disclosure, the second determining module is further configured to, when determining the luminance value interval of each target pixel of the to-be-synthesized image based on the image luminance value of the to-be-synthesized image, the image luminance value of the first association image, and the image luminance value of the second association image of the to-be-synthesized image: determine an initial luminance interval of each target pixel of the to-be-synthesized image based on the image luminance value of the to-be-synthesized image and the image luminance value of the first association image; determine an extended luminance interval of the initial luminance interval based on the image luminance value of the first association image and the image luminance value of the second association image of the to-be-synthesized image; and obtain the luminance value interval of each target pixel of the to-be-synthesized image by stitching the initial luminance interval and the extended luminance interval.

According to one or more embodiments of the present disclosure, the second determining module is further configured to, when determining the extended luminance interval of the initial luminance interval based on the image luminance value of the first association image and the image luminance value of the second association image of the to-be-synthesized image: determine a difference between the image luminance value of the first association image and the image luminance value of the second association image of the to-be-synthesized image; and determine the extended luminance interval of the initial luminance interval based on the difference and a third predetermined value.

According to one or more embodiments of the present disclosure, for the luminance value interval of each target pixel of the to-be-synthesized image, a maximum luminance value in the luminance value interval is equal to or smaller than a maximum one of the image luminance values of the at least two to-be-synthesized images, and a minimum luminance value in the luminance value interval is equal to or greater than a minimum one of the image luminance values of the at least two to-be-synthesized images.

According to one or more embodiments of the present disclosure, there is provided an electronic device including one or more processors, a memory, and one or more applications. The one or more applications are stored in the memory and configured to be executed by the one or more processors to perform the image processing method according to the above embodiments.

According to one or more embodiments of the present disclosure, there is provided computer-readable medium, having a computer program stored thereon. The computer program, when executed by a processor, performs the image processing method according to the above embodiments.

The above description is merely intended to explain the preferred embodiments of the present disclosure and the employed principles of technology. It will be appreciated by those skilled in the art that the scope of the present disclosure herein is not limited to the technical solutions defined by the specific combinations of the above technical features, and should also encompass other technical solutions defined by any other combinations of features described above or equivalents thereof without departing from the above ideas of the present disclosure. For example, the above features and the technical features disclosed in the present disclosure having similar functions (but not limited thereto) are replaced with each other to form the technical solution.

Further, although the operations are depicted in a specific order, this should not be understood as requiring these operations to be performed in the specific order illustrated or in a sequential order. Under certain circumstances, multitasking and parallel process may be advantageous. Likewise, although several specific implementation details are included in the above discussion, these should not be construed as limitations on the scope of the present disclosure. Certain features that are described in the context of separate embodiments can also be implemented in combination in a single embodiment. Conversely, various features described in the context of a single embodiment can also be implemented in multiple embodiments separately or in any suitable combination.

Although the subject matter has been described in language specific to structural features and/or logical actions of method, it should be understood that the subject matter defined in the appended claims is not necessarily limited to the specific features or actions described above. On the contrary, the specific features and actions described above are merely exemplary forms of implementing the claims.

What is claimed is:

1. An image processing method, comprising:
obtaining at least two to-be-synthesized images, the at least two to-be-synthesized images being images of an object captured at different exposures;
determining an image luminance value of each of the at least two to-be-synthesized images;
determining, for each of the at least two to-be-synthesized images, a luminance weight of each pixel of the to-be-synthesized image based on the image luminance value of the to-be-synthesized image and a luminance value of each pixel of the to-be-synthesized image; and
obtaining a target image by performing image synthesis processing based on the luminance value of each pixel of the at least two to-be-synthesized images and the luminance weight of each pixel of the at least two to-be-synthesized images,
wherein said determining the luminance weight of each pixel of the to-be-synthesized image based on the image luminance value of the to-be-synthesized image and the luminance value of each pixel of the to-be-synthesized image comprises:
determining a first association image of the to-be-synthesized image, the first association image being a to-be-synthesized image having an image luminance value adjacent to the image luminance value of the to-be-synthesized image; and
determining the luminance weight of each pixel of the to-be-synthesized image based on the image luminance value of the to-be-synthesized image, the image luminance value of the first association image, and the luminance value of each pixel of the to-be-synthesized image.

2. The method according to claim 1, wherein said determining the luminance weight of each pixel of the to-besynthesized image based on the image luminance value of the to-be-synthesized image, the image luminance value of the first association image, and the luminance value of each pixel of the to-be-synthesized image comprises:

determining a luminance value interval of each target pixel of the to-be-synthesized image based on the image luminance value of the to-be-synthesized image and the image luminance value of the first association image;

determining, when a luminance value of one of pixels of the to-be-synthesized image is within the luminance value interval, a luminance weight of the pixel based on the image luminance value of the to-be-synthesized image, the image luminance value of the first association image, and the luminance value of the pixel; and determining, when the luminance value of the pixel is beyond the luminance value interval, the luminance weight of the pixel to be a first predetermined value.

3. The method according to claim 2, wherein said determining the luminance value interval of each target pixel of the to-be-synthesized image based on the image luminance value of the to-be-synthesized image and the image luminance value of the first association image comprises:

determining, as the luminance value interval of each target pixel of the to-be-synthesized image, an interval defined by the image luminance value of the to-be-synthesized image and the image luminance value of the first association image.

4. The method according to claim 2, wherein for the luminance value interval of each target pixel of the to-be-synthesized image:

a maximum luminance value in the luminance value interval is equal to or smaller than a maximum one of the image luminance values of the at least two to-be-synthesized images; and a minimum luminance value in the luminance value interval is equal to or greater than a minimum one of the image luminance values of the at least two to-be-synthesized images.

5. The method according to claim 1, wherein said determining the luminance weight of each pixel of the to-be-synthesized image based on the image luminance value of the to-be-synthesized image, the image luminance value of the first association image, and the luminance value of each pixel of the to-be-synthesized image comprises:

determining a luminance value interval of each target pixel of the to-be-synthesized image based on the image luminance value of the to-be-synthesized image, the image luminance value of the first association image, and an image luminance value of a second association image of the to-be-synthesized image;

determining, in response to determining that a luminance value of one of pixels of the to-be-synthesized image is within the luminance value interval, a luminance weight of the pixel based on the image luminance value of the to-be-synthesized image, the image luminance value of the first association image, the image luminance value of the second association image, and the luminance value of the pixel; and determining, in response to determining that the luminance value of the pixel is beyond the luminance value interval, the luminance weight of the pixel to be a second predetermined value, wherein the second association image is a to-be-synthesized image other than the to-be-synthesized image and having an image luminance value adjacent to the image luminance value of the first association image.

6. The method according to claim 5, wherein said determining the luminance value interval of each target pixel of the to-be-synthesized image based on the image luminance value of the to-be-synthesized image, the image luminance value of the first association image, and the image luminance value of the second association image of the to-be-synthesized image comprises:

determining an initial luminance interval of each target pixel of the to-be-synthesized image based on the image luminance value of the to-be-synthesized image and the image luminance value of the first association image;

determining an extended luminance interval of the initial luminance interval based on the image luminance value of the first association image and the image luminance value of the second association image of the to-be-synthesized image; and obtaining the luminance value interval of each target pixel of the to-be-synthesized image by stitching the initial luminance interval and the extended luminance interval.

7. The method according to claim 6, wherein said determining the extended luminance interval of the initial luminance interval based on the image luminance value of the first association image and the image luminance value of the second association image of the to-be-synthesized image comprises:

determining a difference between the image luminance value of the first association image and the image luminance value of the second association image of the to-be-synthesized image; and determining the extended luminance interval of the initial luminance interval based on the difference and a third predetermined value.

8. An electronic device, comprising:

one or more processors;

a memory; and one or more applications, wherein the one or more applications are stored in the memory, and configured to be executed by the one or more processors to cause the one or more processor to:

obtain at least two to-be-synthesized images, the at least two to-be-synthesized images being images of an object captured at different exposures;

determine an image luminance value of each of the at least two to-be-synthesized images;

determine, for each of the at least two to-be-synthesized images, a luminance weight of each pixel of the to-be-synthesized image based on the image luminance value of the to-be-synthesized image and a luminance value of each pixel of the to-be-synthesized image; and obtain a target image by performing image synthesis processing based on the luminance value of each pixel of the at least two to-be-synthesized images and the luminance weight of each pixel of the at least two to-be-synthesized images, wherein said determining the luminance weight of each pixel of the to-be-synthesized image based on the image luminance value of the to-be-synthesized image and the luminance value of each pixel of the to-be-synthesized image comprises:

determining a first association image of the to-be-synthesized image, the first association image being a to-be-synthesized image having an image luminance value adjacent to the image luminance value of the to-be-synthesized image; and determining the luminance weight of each pixel of the to-be-synthesized image based on the image luminance value of the to-be-synthesized image, the image luminance value of the first association image, and the luminance value of each pixel of the to-be-synthesized image.

9. The electronic device according to claim 8, wherein said determining the luminance weight of each pixel of the to-be-synthesized image based on the image luminance value of the to-be-synthesized image, the image luminance value of the first association image, and the luminance value of each pixel of the to-be-synthesized image comprises:

determining a luminance value interval of each target pixel of the to-be-synthesized image based on the image luminance value of the to-be-synthesized image and the image luminance value of the first association image;

determining, when a luminance value of one of pixels of the to-be-synthesized image is within the luminance value interval, a luminance weight of the pixel based on the image luminance value of the to-be-synthesized image, the image luminance value of the first association image, and the luminance value of the pixel; and determining, when the luminance value of the pixel is beyond the luminance value interval, the luminance weight of the pixel—to be a first predetermined value.

10. The electronic device according to claim 9, wherein said determining the luminance value interval of each target pixel of the to-be-synthesized image based on the image luminance value of the to-be-synthesized image and the image luminance value of the first association image comprises:

determining, as the luminance value interval of each target pixel of the to-be-synthesized image, an interval defined by the image luminance value of the to-be-synthesized image and the image luminance value of the first association image.

11. The electronic device according to claim 8, wherein said determining the luminance weight of each pixel of the to-be-synthesized image based on the image luminance value of the to-be-synthesized image, the image luminance value of the first association image, and the luminance value of each pixel of the to-be-synthesized image comprises:

determining a luminance value interval of each target pixel of the to-be-synthesized image based on the image luminance value of the to-be-synthesized image, the image luminance value of the first association image, and an image luminance value of a second association image of the to-be-synthesized image;

determining, in response to determining that a luminance value of one of pixels of the to-be-synthesized image is within the luminance value interval, a luminance weight of the pixel based on the image luminance value of the to-be-synthesized image, the image luminance value of the first association image, the image luminance value of the second association image, and the luminance value of the pixel; and determining, in response to determining that the luminance value of the pixel is beyond the luminance value interval, the luminance weight of the pixel to be a second predetermined value, wherein the second association image is a to-be-synthesized image other than the to-be-synthesized image and having an image luminance value adjacent to the image luminance value of the first association image.

12. The electronic device according to claim 11, wherein said determining the luminance value interval of each target pixel of the to-be-synthesized image based on the image luminance value of the to-be-synthesized image, the image luminance value of the first association image, and the image luminance value of the second association image of the to-be-synthesized image comprises:

determining an initial luminance interval of each target pixel of the to-be-synthesized image based on the image luminance value of the to-be-synthesized image and the image luminance value of the first association image;

determining an extended luminance interval of the initial luminance interval based on the image luminance value of the first association image and the image luminance value of the second association image of the to-be-synthesized image; and obtaining the luminance value interval of each target pixel of the to-be-synthesized image by stitching the initial luminance interval and the extended luminance interval.

13. The electronic device according to claim 12, wherein said determining the extended luminance interval of the initial luminance interval based on the image luminance value of the first association image and the image luminance value of the second association image of the to-be-synthesized image comprises:

determining a difference between the image luminance value of the first association image and the image luminance value of the second association image of the to-be-synthesized image; and determining the extended luminance interval of the initial luminance interval based on the difference and a third predetermined value.

14. The electronic device according to claim 9, wherein for the luminance value interval of each target pixel of the to-be-synthesized image:

a maximum luminance value in the luminance value interval is equal to or smaller than a maximum one of the image luminance values of the at least two to-be-synthesized images; and a minimum luminance value in the luminance value interval is equal to or greater than a minimum one of the image luminance values of the at least two to-be-synthesized images.

15. A non-transitory computer-readable medium, having a computer program stored thereon, wherein the computer program, when executed by a processor, causes the processor to:

obtain at least two to-be-synthesized images, the at least two to-be-synthesized images being images of an object captured at different exposures;

determine an image luminance value of each of the at least two to-be-synthesized images;

determine, for each of the at least two to-be-synthesized images, a luminance weight of each pixel of the to-be-synthesized image based on the image luminance value of the to-be-synthesized image and a luminance value of each pixel of the to-be-synthesized image; and obtain a target image by performing image synthesis processing based on the luminance value of each pixel of the at least two to-be-synthesized images and the luminance weight of each pixel of the at least two to-be-synthesized images, wherein the computer program, when executed by the processor, further causes the processor to:

determine a first association image of the to-be-synthesized image, the first association image being a to-besynthesized image having an image luminance value adjacent to the image luminance value of the to-be-synthesized image; and determine the luminance weight of each pixel of the to-be-synthesized image based on the image luminance value of the to-be-synthesized image, the image luminance value of the first association image, and the luminance value of each pixel of the to-be-synthesized image.

16. The non-transitory computer-readable medium according to claim 15, wherein the computer program, when executed by the processor, further causes the processor to:

determine a luminance value interval of each target pixel of the to-be-synthesized image based on the image luminance value of the to-be-synthesized image and the image luminance value of the first association image;

determine, when a luminance value of one of pixels of the to-be-synthesized image is within the luminance value interval, a luminance weight of the pixel based on the image luminance value of the to-be-synthesized image, the image luminance value of the first association image, and the luminance value of the pixel; and determine, when the luminance value of the pixel is beyond the luminance value interval, the luminance weight of the pixel—to be a first predetermined value.

17. The non-transitory computer-readable medium according to claim 16, wherein the computer program, when executed by the processor, further causes the processor to:

determine, as the luminance value interval of each target pixel of the to-be-synthesized image, an interval defined by the image luminance value of the to-be-synthesized image and the image luminance value of the first association image.

* * * * *